United States Patent [19]

Sano et al.

[11] 4,084,979

[45] Apr. 18, 1978

[54] MAGNESIA CERAMIC FOR INSULATION OF HIGH-FREQUENCY ELECTRICITY

[75] Inventors: Shiro Sano; Hiroshi Hayashi, both of Nagoya; Hiroyoshi Takagi, Kasugai, all of Japan

[73] Assignee: Agency of Industrial Science & Technology, Tokyo, Japan

[21] Appl. No.: 749,822

[22] Filed: Dec. 13, 1976

[30] Foreign Application Priority Data

Dec. 25, 1975 Japan ................................ 50-156172

[51] Int. Cl.[2] ............................................. C04B 35/04

[52] U.S. Cl. ........................................ 106/58; 106/62; 106/73.3; 106/73.32; 106/73.4; 106/73.5; 252/63.5

[58] Field of Search ................. 106/73.3, 73.32, 73.40, 106/73.50, 58, 62; 252/63.5

[56] References Cited

U.S. PATENT DOCUMENTS

| | | | |
|---|---|---|---|
| 2,479,504 | 8/1949 | Moore et al. | 106/58 |
| 2,571,526 | 10/1951 | Bonnet | 106/62 |
| 3,647,488 | 3/1972 | Brigham et al. | 106/58 |
| 3,752,684 | 8/1973 | Kiehl et al. | 106/58 |
| 3,920,464 | 11/1975 | Damiano | 106/58 |

*Primary Examiner*—Winston A. Douglas
*Assistant Examiner*—John P. Sheehan
*Attorney, Agent, or Firm*—Kurt Kelman

[57] ABSTRACT

A magnesia ceramic for high-frequency electric insulation is produced by using, as the principal component, magnesia and adding thereto a calcium-magnesium-phosphate and at least one member selected from the group consisting of the oxides of aluminum, silicon, beryllium and tungsten.

2 Claims, No Drawings

MAGNESIA CERAMIC FOR INSULATION OF HIGH-FREQUENCY ELECTRICITY

BACKGROUND OF THE INVENTION

This invention relates to a magnesia ceramic for insulation of high-frequency electricity producible by relatively low temperature burning, excelling in high-frequency dielectric loss and almost totally unsusceptible to warping or cracking.

Sintered magnesia has a particularly low dielectric loss at high frequency and, in this sense, is an excellent material for high-frequency insulators. On the other hand, since magnesia has an extremely high melting point of 2800° C, it is difficult to sinter magnesia of high purity sintered completely. Moreover, sintered magnesia has a disadvantage that it abounds in hydrating property. Because of these disadvantages, magnesia has scarcely been used as the material for high-frequency insulators. It is known in the art that, generally by adding kaolin, clay and a metal oxide to magnesia, desired sintering of magnesia is rendered easier to accomplish and at the same time the sintered magnesia is rendered more resistant to the hydration. Incorporation of such additives, however, entails various problems such as degradation of electric properties at high frequency, for example.

Formerly the inventors made a discovery that a magnesia ceramic formed by low-temperature sintering and possessed of resistance to water and excellent insulation from high-frequency electricity is obtained by treating powdered magnesia in ethanol containing phosphoric acid for thereby giving rise to magnesium phosphate in the green body. In the case of this ceramic, however, there is involved the disadvantage that the ceramic's dielectric loss is relatively high and the ceramic, in the shape of a thin plate in which the ceramic is most frequently used as the insulator for electric current, tends to warp or crack.

The inventors continued devoted study in search of a way of overcoming this disadvantage and have consequently acquired a knowledge that the disadvantage is overcome by incorporating calcium-magnesium-phosphate at specific proportions into the green body prepared for the ceramic for thereby inhibiting formation of free magnesium phosphate, $Mg_3(PO_4)_2$, or beta calcium phosphate, $\beta$-$Ca_3(PO_4)_2$, and at the same time adding thereto a metal oxide capable of preventing the high-frequency dielectric properties from degradation. The present invention has been perfected on the basis of this knowledge.

The major object of this invention is to provide a magnesia ceramic for electric insulation, which excels in resistance to hydration and in high-frequency dielectric loss and which, in the shape of a thin plate, is almost totally free of warping or cracking.

SUMMARY OF THE INVENTION

To fulfil the object described above according to the present invention, there is provided a magnesia ceramic for high-frequency electric insulation which has, as its principal component, magnesia and contains 2.0 to 20% by weight of calcium-magnesium-phosphate of a composition $x$CaO.$y$MgO.$P_2O_5$ (wherein, $x$ and $y$ each have a value falling in the range of from 0.5 to 2.5) and at least one member selected from the group consisting of the oxides of aluminum, silicon, beryllium and tungsten. This magnesia ceramic can be produced by using, as the magnesia source, various kinds of thermally decomposed magnesium salt and adding thereto a calcium-magnesium-phosphate of the prescribed composition or a substance capable of producing said calcium-magnesium-phosphate under the prevalent reaction conditions and said metal oxide, then molding the resultant mixture in a prescribed shape and sintering the shaped mixture.

The other characteristic features and advantages of the present invention will become apparent from the description to be given hereinafter.

DETAILED DESCRIPTION OF THE INVENTION

The magnesia ceramic of this invention can be manufactured by using a commonly-adopted electric furnace provided with silicon carbide heaters or by using a gas furnace. No modification need be made in the conventional process of ceramic production. To be more specific, the product aimed at by this invention can be obtained by adding to magnesia or a magnesium compound the prescribed additive components described in detail hereinafter, mixing these components homogeneously, molding the resultant mix in a prescribed shape and sintering the shaped mold.

In the manufacture of the ceramic of this invention, either magnesia in its neat form or a magnesia source capable of producing magnesia can be used. The magnesia source can freely be selected from various magnesium salts such as basic magnesium carbonate and magnesium chloride which, on thermal decomposition, give to magnesia. To minimize possible shrinkage of the shaped mold while in the course of production of the ceramic, such magnesia source is desired to be calcined at 900° to 1000° C similarly to the other additive components. Where magnesia is used in its neat form as the raw material in this case, magnesia of the grade available generally in the market can be used without any modification. The magnesia available in the market is pure to the degree of 99% and contains as impurities the balance of oxides of such metals as calcium, aluminum and silicon.

The ceramic of this invention contains at least one member selected from the group consisting of the oxides of aluminum, silicon, beryllium and tungsten. The method by which said metal oxide is incorporated in the ceramic of this invention will be described. As the raw material in this case, these metals are used either independently of one another or in the form of composites. In the course of manufacture of the ceramic, such metal component may be added in the form of simple metal, metal oxide, metal hydroxide, metal salt or the like to magnesia or a magnesia source. In any case, once such metal component is subjected to sintering in conjunction with the other components, it comes to exist in the form of an oxide in the produced ceramic. In case where there is used a metal salt or metal hydroxide, it may be added generally in its near form to magnesia. Since magnesia has a hydrating property, however, addition thereof is most effectively accomplished by a procedure comprising the steps of adding such metal salt or metal hydroxide in advance to magnesium hydroxide or basic magnesium carbonate, mixing the two compounds with the aid of added water, pulverizing the resultant mixture and thereafter subjecting the pulverized mixture to calcining at 900° ~ 1000° C. Beryllium is an advantageous metal component for the purpose of such addition, because this particular metal even at an extremely small incorporation ratio (ideally in the neighborhood of 0.4% by weight as oxide) is unusually effective in preventing the final product from warping or cracking. Silicon or aluminum, as the metal component, may be used in the form of kaoline or clay which is popularly used as the raw material for ceramic. In this case, there is derived the advantage that the moldability of the product can be enhanced. While the sintering is in process, such metal produces a liquid phase and consequently facilitates desired sintering of the mixture. Particularly silicon oxide reacts with magnesia to produce forsterite ($2MgO.SiO_2$) and consequently to enhance resistance to hydration and improve high-frequency electric insulation. Tungsten at an extremely small incorporation ratio serves to accelerate the sintering. It comes to exist in the form of calcium tungstate or magnesium tungstate in the sintered ceramic and hardly degrades the electric properties of the produced ceramic. The amount of such metal oxide to be added must be controlled so that its content in the finished ceramic will fall in the range of from 0.25 to 5.0% by weight. If said content fails to reach the lower limit 0.25% by weight, then the sintering effect of ceramic is impaired and the product obtained in the shape of a thin plate tends to entail warping or cracking. If the content exceeds the upper limit 5% by weight, then the high-frequency electric insulation of the produced ceramic falls short of the desired level.

Now, the calcium-magnesium-phosphate required to be contained in the ceramic of this invention will be described. This calcium-magnesium-phosphate has a composition represented by the following formula.

$$xCaO.yMgO.P_2O_5$$

(wherein, $x$ and $y$ each have a value falling in the range of from 0.5 to 2.5).

The calcium-magnesium-phosphate of the composition described above can be added in its unaltered form to magnesia or a magnesia source. Alternatively, different components which eventually will collectively produce this composition may be added in a mixed state thereto. For example, calcium phosphate and magnesium phosphate may be added in respective amounts to give a molar ratio of 1 : 1 to magnesia or a magnesia source so as to produce the commonest composition $Ca_3Mg_3(PO_4)_4$. The aforesaid calcium phosphate and magnesium phosphate may be replaced by compounds such as calcium hydrogen O-phosphate ($CaHPO_4.2H_2O$), magnesium hydrogen O-phosphate ($MgHPO_4.3H_2O$), calcia/phosphoric acid system and bone ash ($3Ca(PO_4)_2.Ca(OH)_2$) which on thermal decomposition produce calcium phosphate or magnesium phosphate. In fact, any compounds may be used as their substitutes in so far as they produce a calcium-magnesium-phosphate of the aforementioned composition in the ceramic after the final sintering.

In the magnesia ceramic of the present invention, the calcium-magnesium-phosphate content is to fall in the range of from 2.0 to 20% by weight. If the content fails to reach the lower limit 2.0% by weight, then the shaped mold being sintered into the final ceramic does not show any sufficient sintering property and the produced ceramic itself fails to offer resistance to hydration. If the content exceeds the upper limit 20% by weight, the shaped mold tends to be deformed in the course of sintering and the produced ceramic suffers from large dielectric loss, although desired sintering may be obtained at lower sintering temperatures.

The magnesia ceramic for high-frequency electric insulation produced by the present invention proves to be particularly advantageous from the practical point of view when the calcium-magnesium-phosphate content falls in the range of from 5 to 15% by weight and the combined content of aluminum oxide and silicon oxide falls in the range of from 0.25 to 5.0% by weight.

The magnesia ceramic of this invention can easily be manufactured by mixing magnesia or a magnesia source with said calcium-magnesium-phosphate and metal oxide and sintering the resultant mixture in a liquid phase. By this procedure, possible formation of magnesium phosphate or beta-calcium phosphate is precluded, strain which occurs in the shaped mold being sintered is eliminated and such defects as warping and cracking are prevented from occuring in the produced ceramic. Moreover, the ceramic of the present invention enjoys the advantage that the resistance to hydration is large and the dielectric loss is unusually small.

Now, the present invention will be described more specifically with reference to working examples.

EXAMPLE 1

To magnesium hydroxide (purity 98.8% and CaO content 0.49%), there were added 5% by weight of calcium phosphate ($Ca_3(PO_4)_2$), 5% by weight of magnesium phosphate tribasic ($Mg_3(PO_4)_2.5H_2O$) calculated as anhydride ($Mg_3(PO_4)_2$), 0.45% by weight of beryllium oxide, 2.5% by weight of hydraulically elutriated Korean kaolin and 0.45% by weight of tungstic acid ($H_2WO_4$) (92.8% by weight as $WO_3$), with the percentages based on the weight of magnesium oxide (MgO) constituent of said magnesium hydroxide. In a pot mill made of alumina, these components were mixed and attrited in the presence of water of a volume 1.5 times as large for about three hours. The resultant mixture was dried in a drier. Then, in an electric furnace provided with nichrome heaters, the dried mixture was calcined in air at 900° C for 1 hour. Thereafter, it was passed through a sieve of 32 mesh. The resultant powder was press molded under 750 kg/cm$^2$ into discs having diameters of 2.8 cm and 6 cm and thicknesses from 2 to 3 mm. In an electric furnace provided with silicon carbide heaters, the discs were heated at a temperature increase ratio of 200° C/hour and sintered at 1450° C for one hour. Neither warping nor cracking was observed to occur at all in the resultant ceramics.

By analysis, the ceramic thus obtained was found to contain 10% by weight of a calcium-magnesium-phosphate having the composition of $1.5CaO.1.5MgO.P_2O_5$, 0.45% by weight of beryllium oxide, 1.15% by weight of silicon oxide, 0.95% by weight of aluminum oxide, 0.42% by weight of tungsten oxide and a total of 2.52% by weight of metal oxides. The water absorption was less than 0.01% by weight, the hydration ratio was less than 0.2% by weight, the dielectric loss (tan δ) was lower than $1 \times 10^{-4}$ and the Te value was 1040° C. The hydraulically elutriated Korean kaolin was found to have the following chemical analysis (in % by weight).

| $SiO_2$ | $TiO_2$ | $Al_2O_3$ | $Fe_2O_3$ | CaO | MgO | $K_2O$ | $Na_2O$ | Ig. Loss |
|---|---|---|---|---|---|---|---|---|
| 45.87 | 0.08 | 38.01 | 0.61 | 0.61 | 0.22 | 0.39 | 0.5 | 13.99 |

The hydration ratio of a given sample was determined in accordance with the following formula by using the relevant numerical values found of said sample before and after a treatment performed thereon in an autoclave under 10 atmospheres for 1 hour.

$$\text{Hydration ratio} = \frac{\begin{array}{c}\text{(Weight of sample after drying at 100° C for 24 hours)} - \\ \text{(Weight of sample after heating at 800° C for 1 hour)}\end{array}}{\text{(Weight of sample after heating at 800° C for 1 hour)}} \times 100\ (\%)$$

The dielectric loss (tan δ) was measured at a fixed frequency of 1 MHz with a Q meter.

EXAMPLE 2

Test specimens were prepared by using the components in varying percentage compositions by following the procedure of Example 1. The results of the test performed thereon are shown in Table 1 and the compositions of the produced ceramics are shown in Table 2.

The hydraulically elutriated Korean kaolin used as one additive in this example was the same as that used in Example 1. The symbols used in the table for identification of mineral components have the following meanings.

P: MgO $C_3P_2$: $Ca_3(PH_4)_2$ $M_3P_2$: $Mg_3(PO_4)_2$ CW: $CaWO_4$ F: $2MgO.SiO_2$ CMP: $Ca_3Mg_3(PO_4)_4$, $Ca_4Mg_5P_6O_{24}$, $Ca_7Mg_2P_6O_{24}$, etc.

Table 1

| | Amount of mixture (molar ratio of 1:1 in neat form) of $Ca_3(PO_4)_2$ and $Mg_2(PO_4)_2$ added (% by weight) | Kind of additive and amount (% by weight) | | Condition of sintering (temp. and time) | Water absorption (% by weight) | Hydration ratio (% by weight) | Dielectric loss (tan δ) (1MHz, × $10^{-4}$) | Te value (° C) | Warping or cracking | Identification of mineral (by X-ray diffraction) |
|---|---|---|---|---|---|---|---|---|---|---|
| 1 | 10 | $H_2WO_4$ | 0.45 | 1450° C 1 hour | 0.02 > | 0.2 > | 1.2 | 1010 | absence | P,CMP |
| 2 | " | Korean kaolin | 2.5 | " | " | " | 1 | 980 | " | P,CMP,F |
| 3 | " | NONE | | " | 4.2 | 5.5 | " | 1010 | presence | P,CMP,β-$C_3P_2$ |
| 4 | 0 | $H_3PO_4$<br>$CaWO_4$ | 10<br>0.625 | " | 0.01 > | 0.2 > | 1.3 | 1050 | " | P,$M_3P_2$,CW |
| 5 | " | $H_3PO_4$<br>Korean kaolin<br>$CaWO_4$ | 10<br>2.5<br>0.625 | " | " | " | 3 | — | absence | P,$M_3P_2$,F |
| 6 | " | " | | 1550° C 1 hour | 0.02 > | 0.1 > | 4 | — | presence | " |
| 7 | " | $H_3PO_4$<br>Korean kaolin | 9.2<br>2.3 | 1450° 1 hour | " | 0.2 > | 5 | 1000 | absence | P,$M_3P_2$, CMP,F |
| 8 | 10 | BeO<br>$H_2WO_4$ | 0.45<br>0.45 | " | 0.01> | " | 1 > | 980 | " | P,CMP,β-$C_3P_2$ |
| 9 | 10 | BeO<br>$H_2WO_4$<br>Korean kaolin | 0.45<br>0.45<br>2.5 | " | 0.01> | " | " | 1040 | " | P,CMP,F |
| 10 | " | BeO<br>Korean kaolin | 0.45<br>2.5 | " | 0.01 > | 0.2 > | " | 980 | " | " |
| 11 | " | " | | 1500° C 1 hour | 0.01 | 0.1 | " | — | " | " |
| 12 | 5 | $H_3PO_4$<br>Korean kaolin | 5<br>5 | 1450° C 1 hour | 0.01 > | 0.2 > | 2 | 800 | absence | P,CMP,F |
| 13 | 10 | BeO | 0.45 | " | " | 0.1 > | 1 > | 1010 | " | P,CMP |
| 14 | 15 | BeO | 2 | 1500° C 1 hour | 0.02 > | 0.2 > | " | 1100 | " | " |
| 15 | 10 | Korean kaolin<br>$H_3PO_4$ | 2.5<br>1.45 | 1450° C 1 hour | 0.01 > | " | " | 1025 | " | P,CMP,F |

Table 2

| | Composition of ceramic | | | | | | | |
|---|---|---|---|---|---|---|---|---|
| | xCaO . y . MgO . $P_2O_5$ | | | Metal oxide (% by weight) | | | | |
| | x | y | weight % | Al | Si | Be | W | Total |
| 1 | 1.5 | 1.5 | 10 | — | — | — | 0.42 | 0.42 |
| 2 | " | " | " | 0.95 | 1.15 | — | — | 2.10 |
| 3 | " | " | " | — | — | — | — | 0 |
| 4 | — | 1.5 | 6.2 | — | — | — | 0.5 | 0.5 |
| 5 | " | " | " | 0.95 | 1.15 | — | 0.5 | 2.6 |
| 6 | " | " | " | " | " | — | " | " |
| Table 2-continued | | | | | | | | |
| 7 | " | " | 5.7 | 0.87 | 1.45 | — | — | 2.32 |
| 8 | 1.5 | 1.5 | 10 | — | — | 0.45 | 0.42 | 0.87 |
| 9 | " | " | " | 0.95 | 1.15 | " | " | 2.97 |
| 10 | " | " | " | " | " | " | — | 2.55 |
| 11 | " | " | " | " | " | " | — | " |
| 12 | " | " | 8.1 | 1.9 | 2.3 | — | — | 4.2 |
| 13 | " | " | 10 | — | — | 0.45 | — | 0.45 |
| 14 | " | " | 15 | — | — | 2.0 | — | 2.0 |
| 15 | " | " | 10.85 | 0.95 | 1.15 | — | — | 2.1 |

EXAMPLE 3

To magnesium hydroxide described in Example 1 was added 4% by weight of a synthesized magnesium-calcium-phosphate of the composition $Mg_3Ca_3(PO_4)_4$. Then, 5% by weight of aluminium oxide hydrate ($Al_2O_3$ $3H_2O$) was added. In a pot mill, the mixture was blended and attrited in the presence of added water and thereafter calcined at 900° C for 1 hour to obtain a powder. By using this powder as the raw material, discs similar to those dealt with in Example 1 were produced. These discs were sintered at 1500° C for 1 hour and subjected to test. Neither cracking nor warping was observed to occur in the discs. The ceramic was found by analysis to comprise 4% by weight of 1.5.CaO.1.5-MgO.$P_2O_5$, 3.27% by weight of aluminum oxide and 91.5% by weight of MgO. By X-ray analysis, presence of a fairly large amount of β-$Ca_3(PO_4)_2$ was found. The dielectric loss (tan δ) was 1.5 × $10^{-4}$.

EXAMPLE 4

The same magnesium hydroxide as indicated in Example 1 was calcined at 900° C for 1 hour. To the calcination product were added 15% by weight of magnesium-calcium-phosphate, $Mg_3Ca_3(PO_4)_4$, and 2% by weight of silicon. The mixture was blended and attrited for about three hours in the presence of ethanol of a volume 1.5 times as large. Subsequently, discs of ceramic were produced similarly to Example 1 and sintered at 1450° C for 1 hour. Neither cracking nor warping was observed to occur in the produced disc ceramics. By analysis, the ceramic was found to comprise 15% by weight of $1.5CaO.1.5MgO.P_2O_5$, 4.28% by weight of silicon oxide and 79.5% by weight of MgO. The dielectric loss (tan $\delta$) was less than $1 \times 10^{-4}$.

EXAMPLE 5

To a light-burned magnesia containing 5% by weight of calcium oxide as an impurity, there were added 15% by weight of phosphoric acid, 3% by weight of hydraulically elutriated Korean kaolin and 1.5% by weight of beryllium oxide. The mixture was blended and attrited in ethanol. Discs were prepared by following the procedure of Example 1 and sintered at 1400° C for 1 hour. The ceramic was found to comprise 10% by weight of $0.5CaO.0.5MgO.P_2O_5$, a total of 4.02% by weight of metal oxides (consisting of 1.14% by weight of aluminum oxide, 1.38% by weight of silicon oxide and 1.5% by weight of beryllium oxide) and 84.8% by weight of MgO. Neither cracking nor warping was observed to occur in the discs. The water absorption was 0.01% by weight. The hydration ratio was 0.2% by weight. The dielectric loss (tan $\delta$) was less than $1 \times 10^{-4}$ and the Te value was 960° C.

EXAMPLE 6

To high-purity magnesium hydroxide (containing 0.03% by weight of $SiO_2$, trace of $Al_2O_3$, 0.02% by weight of $TiO_2$, 0.01% by weight of $Fe_2O_3$ and traces of MnO, CaO, $Na_2O$ and $K_2O$) was added a total of 12.5% by weight of calcium secondary phosphase ($CaHPO_4.2H_2O$) and magnesium hydrogen O-phosphate ($MgHPO_4.3H_2O$) in the combined compositions of $Ca_3Mg_3(PO_4)_4$. Then, 3% by weight of beryllium hydroxide calculated as BeO and 1% by weight of ammonium tungstate ($5(NH_4)_2O.12WO_3.5H_2O$) were added. The mixture was blended and attrited in the presence of water in a pot mill made of alumina and then calcined at 950° C for 1 hour. By using the resultant powder as the raw material, discs similar to those of Example 1 were produced. These discs were sintered at 1400° C for 1 hour. Neither cracking nor warping was observed to occur in the discs. The ceramic was found by analysis to comprise 12.5% by weight of $1.5CaO.1.5MgO.P_2O_5$, 3.0% by weight of beryllium oxide, 0.13% by weight of tungsten oxide and 83.1% by weight of MgO. The water absorption was smaller than 0.01% by weight, the ratio of hydration was less than 0.1% by weight, the dielectric loss (tan $\delta$) was less than $1 \times 10^{-4}$ and the Te value was 1010° C.

EXAMPLE 7

To a light burned magnesia containing 5% by weight of calcium oxide as an impurity, there was added 5% by weight, calculated as $Mg_3(PO_4)_2$, of a magnesium phosphate solution (obtained by adding 30 g of magnesium phosphate tribasic, $Mg_3(PO_4)_25H_2O$, to 75 cc of 85% by weight of phosphoric acid available in the market, heating the mixture to 130°-150° C until the mixture became clear and then adding 300 cc of ethanol thereto). The resultant mixture was thoroughly stirred with 2.5% by weight of hydraulically elutriated Korean kaolin. Then, test specimens were prepared by following the procedure of Example 1 and sintered at 1500° C for 0.5 hour. The product was found by analysis to comprise 10% by weight of $1.5CaO.1.5MgO.P_2O_5$, 0.95% by weight of aluminum oxide, 1.15% by weight of silicon oxide and 86.7% by weight of MgO. By X-ray analysis, $Ca_3Mg_3(PO_4)_4$ and $Ca_4Mg_5(PO_4)_6$ were identified. The ceramic discs had good surface conditions and were free from cracking and warping.

EXAMPLE 8

To a high-purity basic magnesium carbonate (more than 99% as MgO), there were added 2.5% by weight of hydraulically elutriated korean Kaolin and 6% by weight of bone ash, with said percentages based on the weight of the magnesia component of said magnesium carbonate. The resultant mixture was blended and attrited in a pot mill of alumina in the presence of water of a volume 1.5 times as large for about three hours. Then, by following the procedure of Example 1, the resultant powder was sintered at 1450°-1500° C for 1 hour. Consequently, there were obtained sintered products absolutely free from warping or cracking and enjoying highly advantageous surface conditions (smoothness and flatness). These products were found by analysis to comprise 5% by weight of $1.5CaO.1.5MgO.P_2O_5$, 1.03% by weight of aluminum oxide, 1.18% by weight of silicon oxide and 91.5% by weight of MgO. The water absorption was less than 0.1% by weight, the ratio of hydration was less than 0.2% by weight, the dielectric loss (tan $\delta$, 1 MHz) was $1 \times 10^{-4}$ and the Te value was 1100° C. The minerals identified by the X-ray analysis were $Ca_3Mg_3(PO_4)_4$ and $2MgO\ SiO_2$ and MgO. In this case, formation of $Ca_3Mg_3(PO_4)_4$ is logically explained by assuming that secondary union of magnesia resulted because of decomposition of bone ash.

The bone ash used in this example had the following chemical analyses (in % by weight).

| $SiO_2$ | $TiO_2$ | $Al_2O_3$ | $Fe_2O_3$ | CaO | MgO | $K_2O$ | $Na_2O$ | $P_2O_5$ | Ig. loss |
|---|---|---|---|---|---|---|---|---|---|
| 0.45 | 0.01 | 0.13 | 0.01 | 54.50 | 0.75 | 0.30 | 1.60 | 41.10 | 1.11 |

EXAMPLE 9

To the same magnesium hydroxide as used in Example 1, there were added 5% by weight of calcium phosphate tribasic, 2.5% by weight of hydraulically elutriated Korean kaolin and water of a volume 1.5 times as large. Subsequently, there was added, 2.55% by weight of phosphoric acid (85% $H_3PO_4$, specific gravity 1.7, $P_2O_5$ 61.5% by weight). In a pot mill of alumina, the resultant mixture was blended and attrited for 3 hours. The slurry thus formed was transferred from said pot mill into a crucible made of alumina. Inside an electric furnace provided nichrome heaters, the slurry in the crucible was gradually heated to the maximum temperature of 900° C, at which temperature it was held for 1 hour. Then, the slurry was passed through a sieve of 32 mesh. Thereafter, the residue was sintered at 1450°-1500° C by following the procedure of Example 1. The sintered product was found to sustain neither warping nor cracking. The water absorption was less than 0.01% by weight, the ratio of hydration was less than 0.2% by weight, the dielectric loss (tan δ) was $1 \times 10^{-4}$ and the Te value was 1110° C. The ratios of the components used and the mineral contents determined by the X-ray analysis are shown in Table 3.

Table 3

| x | y | Weight % | Al | Si | Total | wt % (by the X-ray analysis) MgO | $2MgO . SiO_2$ | $Ca_3Mg_3(PO_4)_4$ |
|---|---|---|---|---|---|---|---|---|
| 1.5 | 1.5 | 10 | 0.95 | 1.15 | 2.1 | 82.5 | 1.9 | 9.2 |

COMPARISON EXAMPLE 1

To the same magnesium hydroxide as indicated in Example 1, there were added 4.8% by weight of phosphoric acid, 0.7% by weight of magnesium phosphate, tribasic, 0.56% by weight of calcium phosphate and 0.084% by weight of tungstic acid. The resultant mixture was blended and attrited, then calcined at 1000° C for one hour and molded into discs similarly to Example 1. The discs were sintered at 1450° C for 1 hour. The produced ceramic discs were found by analysis to contain 5% by weight of $0.15CaO.1.0MgO.P_2O_5$ and 0.08% by weight of tungsten oxide. Large cracks were found on the surface of the discs. It is evident that desired ceramic products cannot be obtained where the calcium-magnesium-phosphate content and the metal oxide content in the ceramic composition are short of the prescribed levels.

COMPARISON EXAMPLES 2–3

Discs were manufactured by using the same magnesium hydroxide as indicated in Example 1 and following the procedure of Example 1, except for omission of the addition of tungstic acid. A ceramic disc 1.1 mm in thickness obtained by one hour's sintering in a vacuum furnace ($10^{-4}$ mmHg) at 1500° C was tested for full translucency through the G filter by the H.T.R. meter made by Nippon Seimitsu K.K. The results are shown in Table 4. For comparison, the results similarly obtained of test specimens of Example 1 are also indicated in the Table.

Table 4

| | Components used (in % by weight) $Mg_3(PO_3)_2/Ca_3(PO_4)_2$ (molar ratio 1 : 1) | $H_2WO_4$ | Full translucency (%) |
|---|---|---|---|
| Comparison Example 2 | 20 | — | 13.1 |
| Comparison Example 3 | 10 | — | 5.5 |
| Example 1 | 10 | 0.45 | 25.2 |

The ceramic obtained in Comparison Example 2 was found to comprise 20% by weight of $1.5CaO.1.5MgO.P_2O_5$ and 78.8% by weight of MgO. The ceramic of Comparison Example 3 was found to comprise 10% by weight of $1.5CaO.1.5MgO.P_2O_5$ and 88.8% by weight of MgO.

The test results indicate that the desirability of sintering increases with the increasing value of full translucency. Table 4 evidently shows that the product obtained by the present invention exhibits a notably increased degree of full translucency and provides advantageous sintering.

What is claimed is:

1. A magnesia ceramic for high-frequency electric insulation, consisting essentially of magnesia as the principal component, 2.0 to 20% by weight of a calcium-magnesium-phosphate of the composition $xCaO.yMgO.P_2O_5$, wherein, $x$ and $y$ each have a value falling within the range of from 0.5 to 2.5; and 0.25 to 5.0% by weight of at least one member selected from the group consisting of the oxides of aluminum, silicon, beryllium and tungsten.

2. A magnesia ceramic for high-frequency electric insulation according to claim 1, wherein the calcium-magnesium-phosphate content falls in the range of from 5 to 15% by weight and the combined content of aluminum oxide and silicon oxide falls in the range of from 0.25 to 5.0% by weight.

* * * * *